(12) United States Patent
Shafik et al.

(10) Patent No.: US 11,360,968 B1
(45) Date of Patent: Jun. 14, 2022

(54) SYSTEM AND METHOD FOR IDENTIFYING ACCESS PATTERNS

(71) Applicant: EMC IP Holding Company LLC, Hopkinton, MA (US)

(72) Inventors: Farida Ahmed Ali Shafik, Cairo (EG); Omar Mohammed Mohammed Abdulaal, Cairo (EG); Shary George Waheeb Beshara, Cairo (EG); Nicole Reineke, Northborough, MA (US); Ahmad Refaat Abdelfadeel Ahmad ElRouby, Cairo (EG); Joel Evans Christner, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/235,215

(22) Filed: Apr. 20, 2021

(51) Int. Cl.
  *G06F 16/242* (2019.01)
  *G06F 16/248* (2019.01)
  *G06F 16/901* (2019.01)

(52) U.S. Cl.
  CPC ........ *G06F 16/2425* (2019.01); *G06F 16/248* (2019.01); *G06F 16/9024* (2019.01)

(58) Field of Classification Search
  CPC . G06F 16/2425; G06F 16/248; G06F 16/9024
  See application file for complete search history.

(56) References Cited

U.S. PATENT DOCUMENTS

| | | | | |
|---|---|---|---|---|
| 9,876,801 | B1 * | 1/2018 | Scott | H04L 63/104 |
| 10,554,665 | B1 * | 2/2020 | Badawy | H04L 63/0892 |
| 10,862,928 | B1 * | 12/2020 | Badawy | G06N 5/02 |
| 10,938,828 | B1 * | 3/2021 | Badawy | G06N 20/00 |
| 11,196,775 | B1 * | 12/2021 | Badawy | G06N 5/04 |
| 2018/0069897 | A1 * | 3/2018 | Morris | H04L 63/20 |
| 2021/0019674 | A1 * | 1/2021 | Crabtree | G06F 15/76 |
| 2021/0168150 | A1 * | 6/2021 | Ross | G06Q 10/105 |
| 2021/0279284 | A1 * | 9/2021 | Yu | H04L 9/3247 |
| 2022/0035342 | A1 * | 2/2022 | Cella | G05B 19/4155 |

\* cited by examiner

*Primary Examiner* — Jorge A Casanova
(74) *Attorney, Agent, or Firm* — Chamberlain, Hrdlicka, White, Williams & Aughtry

(57) ABSTRACT

An information handling system for servicing search requests for information stored in data assets includes storage for storing a graph database based on at least one data catalog for the data assets. The information handling system also includes a processor that obtains, from a requestor, a search request of the search requests, the search request specifies a keyword search term; obtains a first identifier of a data asset of the data assets using the graph database and the keyword search term; and provides the first identifier as a supplemental result for the search request.

17 Claims, 11 Drawing Sheets

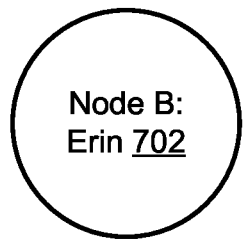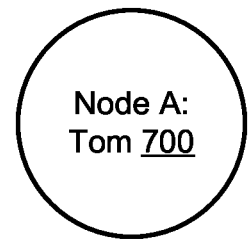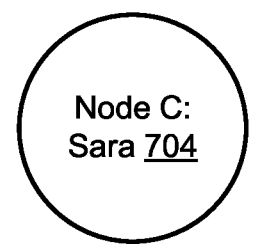
FIG. 7.1

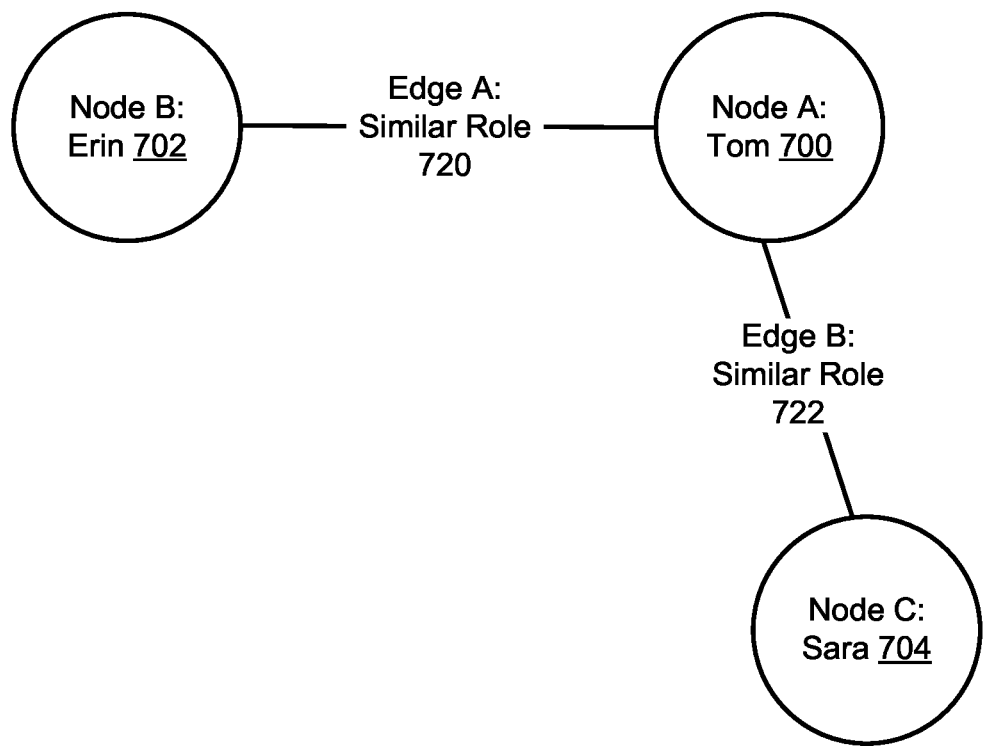
FIG. 7.2

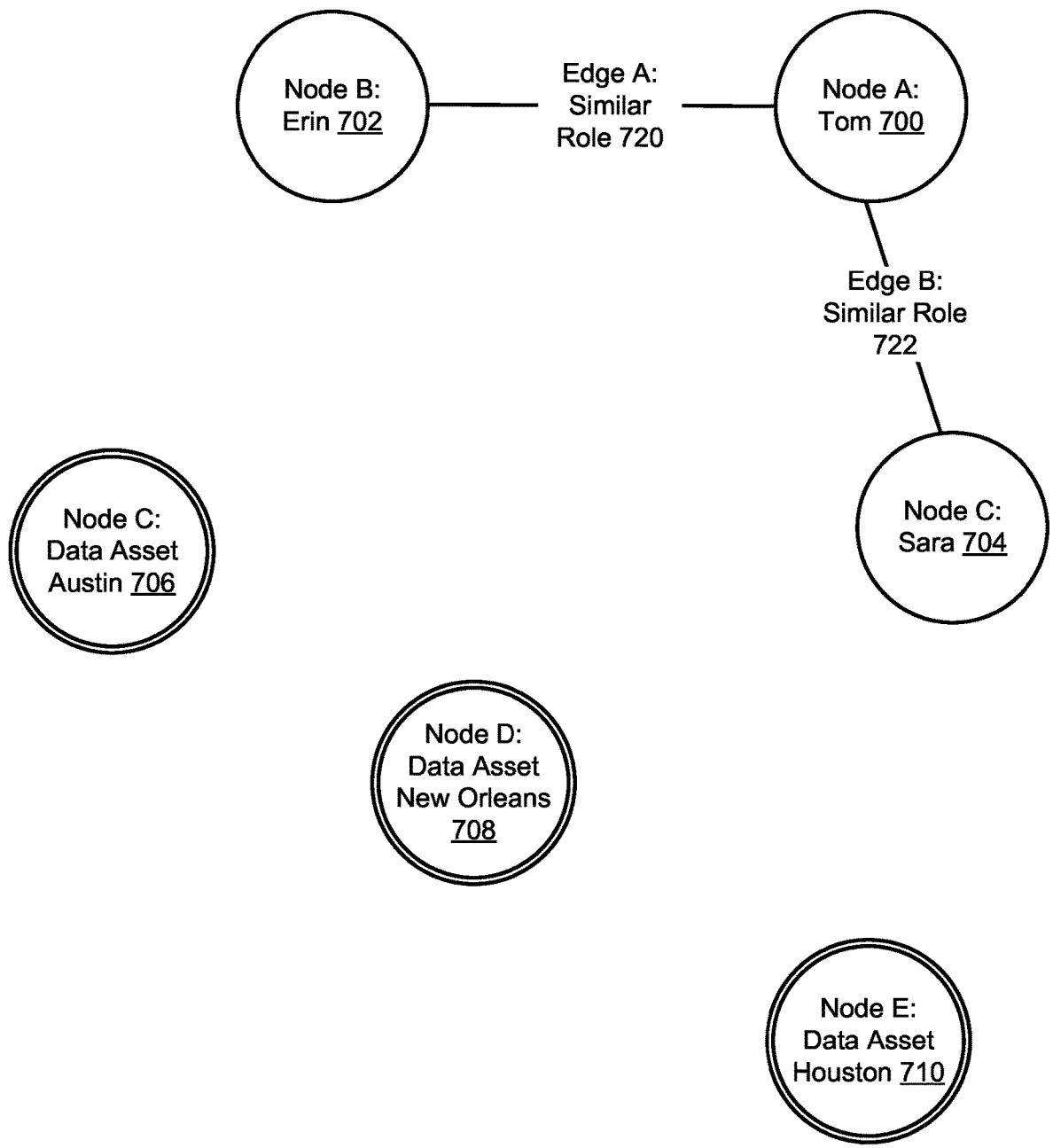
FIG. 7.3

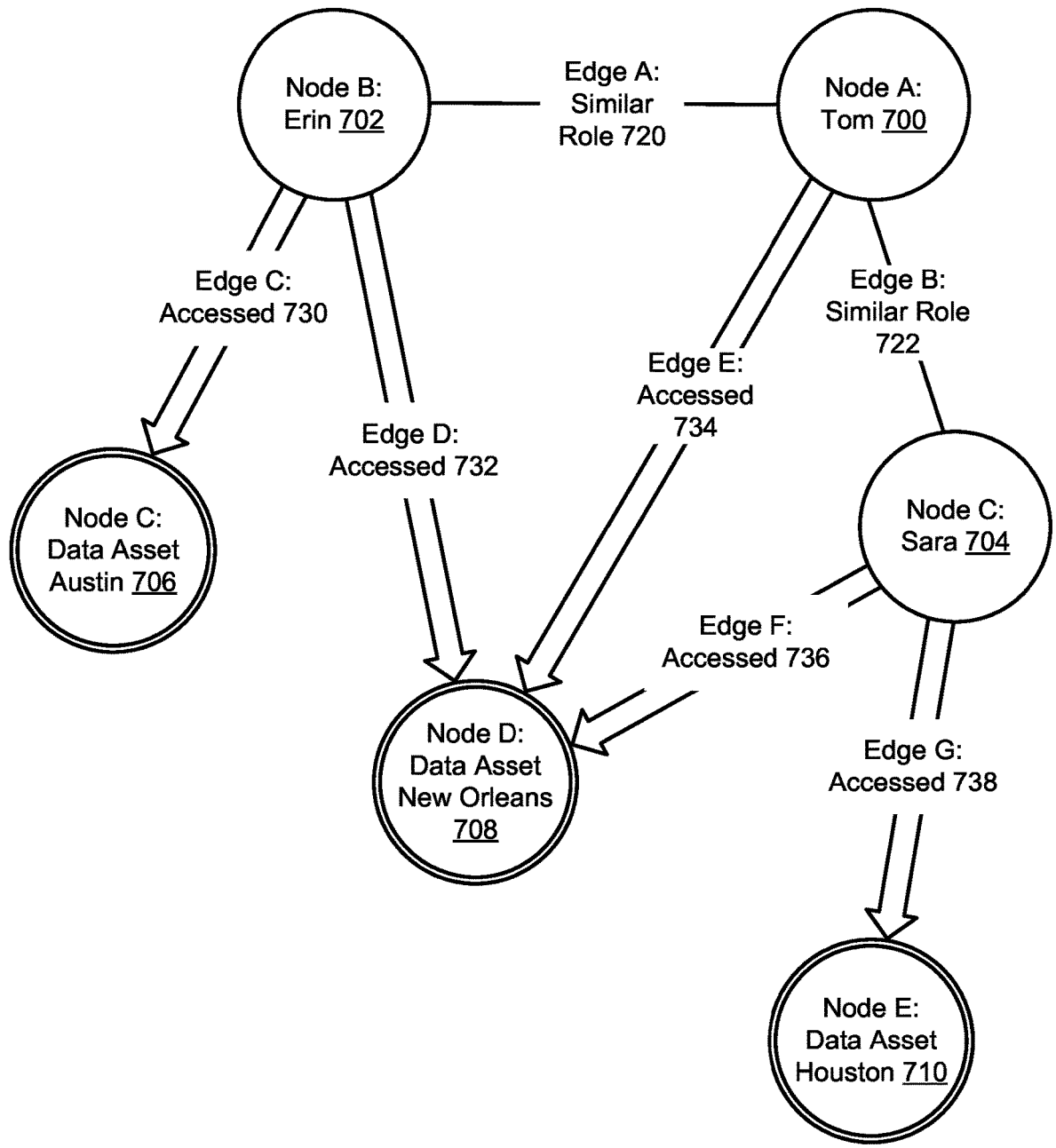
FIG. 7.4

SYSTEM AND METHOD FOR IDENTIFYING ACCESS PATTERNS

BACKGROUND

Computing devices may provide services. To provide the services, the computing devices may include hardware components and software components. The services provided by the computing devices may be limited by these components.

SUMMARY

In one aspect, an information handling system for servicing search requests for information stored in data assets in accordance with one or more embodiments of the invention includes storage for storing a graph database based on at least one data catalog for the data assets. The information handling system also includes a processor that obtains, from a requestor, a search request of the search requests, the search request specifies a keyword search term; obtains a first identifier of a data asset of the data assets using the graph database and the keyword search term; and provides the first identifier as a supplemental result for the search request.

In one aspect, a method for servicing search requests for information stored in data assets in accordance with one or more embodiments of the invention includes obtaining, from a requestor, a search request of the search requests, the search request specifies a keyword search term; obtaining a first identifier of a data asset of the data assets using a graph database and the keyword search term, the graph database is based on based on at least one data catalog for the data assets; and providing the first identifier as a supplemental result for the search request.

In one aspect, a non-transitory computer readable medium in accordance with one or more embodiments of the invention includes computer readable program code, which when executed by a computer processor enables the computer processor to perform a method to service search requests for information stored in data assets. The method includes obtaining, from a requestor, a search request of the search requests, the search request specifies a keyword search term; obtaining a first identifier of a data asset of the data assets using a graph database and the keyword search term, the graph database is based on based on at least one data catalog for the data assets; and providing the first identifier as a supplemental result for the search request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 7.1-7.4 show diagrams of visualization of a graph database as it is constructed in accordance with one or more embodiments of the invention.

DETAILED DESCRIPTION

Figure 1:
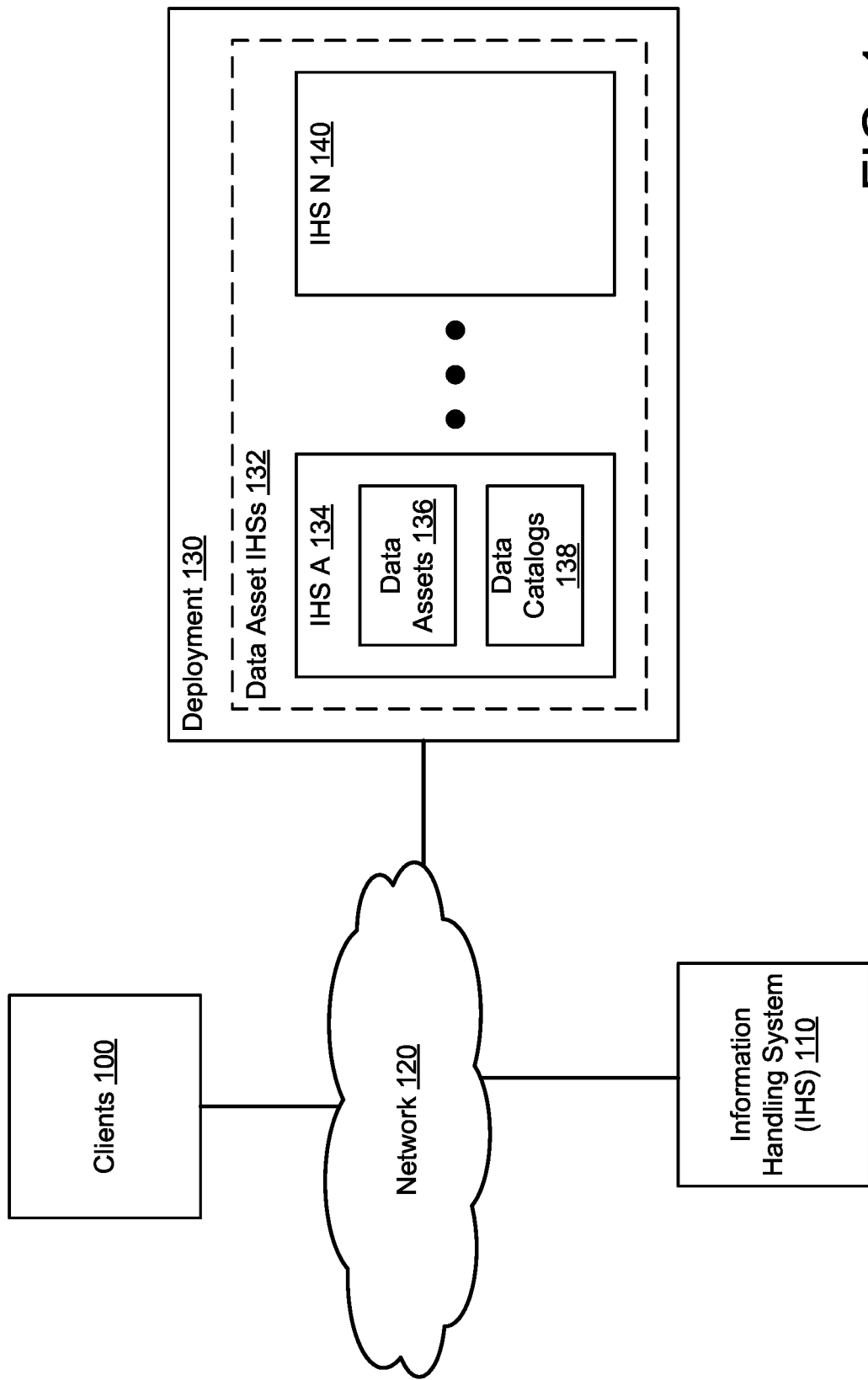
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing search services. Organizations may store data in a variety of data structures across any number of devices. Each of these data structures may include information that may be usable for a user to complete a task. However, these data structures may include limited metadata that may be identifying whether any data structure includes information that may be relevant for completing a difficult task. For example, the data structures may not include sufficient metadata to ensure that keyword searching is able to identify all data sources that include information relevant to complete a task.

Embodiments of the invention may facilitate identification of data structures that include data that is relevant to a search. To facilitate identification of the data structures, a system in accordance with embodiments of the invention may obtain a graph database. The graph database may specify (i) users of the data structures, (ii) relationships between the users, (iii) the data structures that are or may be made available to a user (e.g., a search requestor), and (iv) uses of the data structures by the users. The graph database may include nodes corresponding to both the users and the data structures. The graph database may further include edges, between the nodes, based on the relationships between the users and uses of the data structures by the users.

When a keyword search is initiated, the keyword and/or requestor of the search may be used as keys for the graph database to identify one or more nodes of the graph database. Graph traversal from the identified nodes (via connecting edges) may be performed to identify one or more data structures (corresponding to additional nodes connected by the edges) that are likely to include information that is relevant to the keyword search.

The identifiers of the one or more data structures and/or other information may be provided as a supplemental search result (e.g., in addition to a primary search result identified by keyword searching).

By doing so, users may be presented with additional search results that would otherwise be unlikely to be identified based on keyword searching alone. Consequently, a system in accordance with embodiments of the invention may be better able to provide users with sources of relevant information, thereby improving the usability of the system, decreasing a cognitive burden on users (e.g., requiring users to know all possible sources of relevant information), and/or reducing the resources consumed for search purposes (e.g., due to repeated keyword searches using a variety of terms).

Turning to FIG. 1, FIG. 1 shows a system in accordance with one or more embodiments of the invention. The system may include any number of clients (100). The clients (100) may provide computer implemented services to users of the clients (100) (and/or other devices such as, other clients or other types of devices). The clients (100) may provide any number and type of computer implemented services (e.g., data storage services, electronic communication services, etc.).

To provide these computer implemented services, the entities hosted by the clients (e.g., applications) may utilize information from any number of sources. For example, the clients (100) may utilize information stored in a deployment (130) operably connected to the clients (100) by a network (120). The clients (100) may utilize information from other sources without departing from embodiments of the invention.

To assist users of the clients (100) in identifying information that may be relevant for their needs, the clients (100) may provide information searching functionality. This functionality may enable the clients (100) to present results of searches for information to their users (e.g., through a graphical user interface or other method). To provide this functionality to the users, the clients (100) may utilize search functionality provided by any number of entities (e.g., not shown in FIG. 1 but may be operably connected to the clients (100) and search functionality provided by an information handling system (110)).

For example, any number of entities may provide various types of information search functionality. These search functionalities may include, for example, key word searching of data stored in the deployment (130) and/or other sources. However, these types of search functionalities may be limited and may not provide all possible information that may be relevant to a search being performed by the clients (100). Consequently, the data stored in the deployment (130) may include information that is relevant to a user (or other search initiator) but is not provided by search functionality provided by these entities.

In general, embodiments of the invention relate to systems, devices, and methods for providing search functionality for information that may be relevant to a user. Specifically, embodiments of the invention may provide a method for searching for information using a graph database maintained by an information handling system (110). The graph database may be based on data catalogs (e.g., 138) that include (i) information regarding various data assets (e.g., 136) hosted by any number of information handling systems, (ii) information regarding users of the data assets, and/or (iii) information regarding the use of the data assets by users as well as other sources of information (e.g., such as information regarding users). When a search request is obtained, primary search results (e.g., search results provided using search methods that do not utilize a graph database based on the data catalogs) and supplemental search results (e.g., search results provided using search methods that utilize the graph database based on the data catalogs) may be obtained by a client and provided as a result of a search request.

By utilizing the graph database to obtain the supplemental search results, a broader array of search results may be provided to users in response to a search. Consequently, more information that may be relevant to a user may be presented to a user when compared to only providing primary search results in response to a search.

When a client obtains a search request for a keyword, the client may invoke the search functionality of other entities and the information handling system (110) to obtain both primary and supplemental search results. However, the client may only invoke the search functionality of the information handling system (110) (and may only provide supplemental search results or may also provide primary search results using the graph database hosted by the information handling system (110) or other search tools) to service a search request without departing from the invention.

The information handling system (110) may provide search functionality to the clients (100). Search functionality may include (i) obtaining a search request (that specifies one or more keywords for searching) and/or other information relevant to the search request, (ii) utilizing a graph database to obtain a supplemental search result, and/or (iii) providing the supplemental search result to an entity (e.g., a client) to respond to (e.g., to satisfy) the search request. The supplemental search result may not be identifiable via keyword searching for the one or more keywords. Consequently, the information handling system (110) may provide additional information that may be relevant to a particular search.

In one or more embodiments of the invention, the search requests are used by users of the clients (100) to identify data assets (e.g., 136) that may include information relevant to a task which the user is attempting to complete. Once identified, the users may utilize the identified data assets to complete the task.

To provide search functionality, the information handling system (110) may maintain a graph database. The graph database may be based on data catalogs (e.g., 138) that include information regarding (i) data assets (e.g., 136) that may be accessed by (or may become accessible to) the users (e.g., such as data assets of an organization to which the user belongs), (ii) users that have or may utilize the data assets, (iii) relationships between the users, and/or (iv) actions performed by the users with respect to the data assets. The graph database may also be based on other sources of information (e.g., data stores that include information regarding users, identity stores, etc.).

In addition, various types of information regarding the use of data sources may also be included in the graph databases to further identify the relevancy of various data assets with respect to a search request.

For example, the frequency of access of different data assets may be used to infer the relative relevance of each of the data assets. When multiple data assets are identified as potentially including relevant information, these data assets may be ranked to further indicate to a user which of the data assets are more likely to include relevant information.

In another example, the ordering of accesses by a user may be used to infer the relative relevance of each of the data assets. If an access pattern by one or more users is able to be ascertained (e.g., after accessing a first data asset, users tend to access a second data asset), various access patterns may be used to infer the relevance of data assets with respect to one another. Similarly, such access patterns may be usable to direct users with similar roles to data assets that are likely to be relevant.

Figure 2:
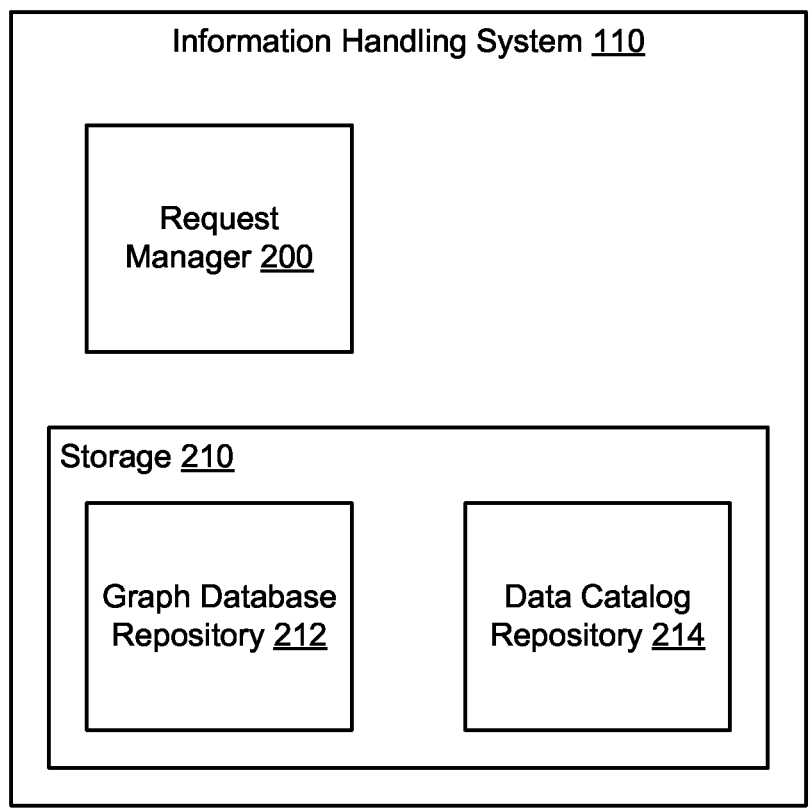
FIG. 2 shows a diagram of an information handling system in accordance with one or more embodiments of the invention.
Figure 3:
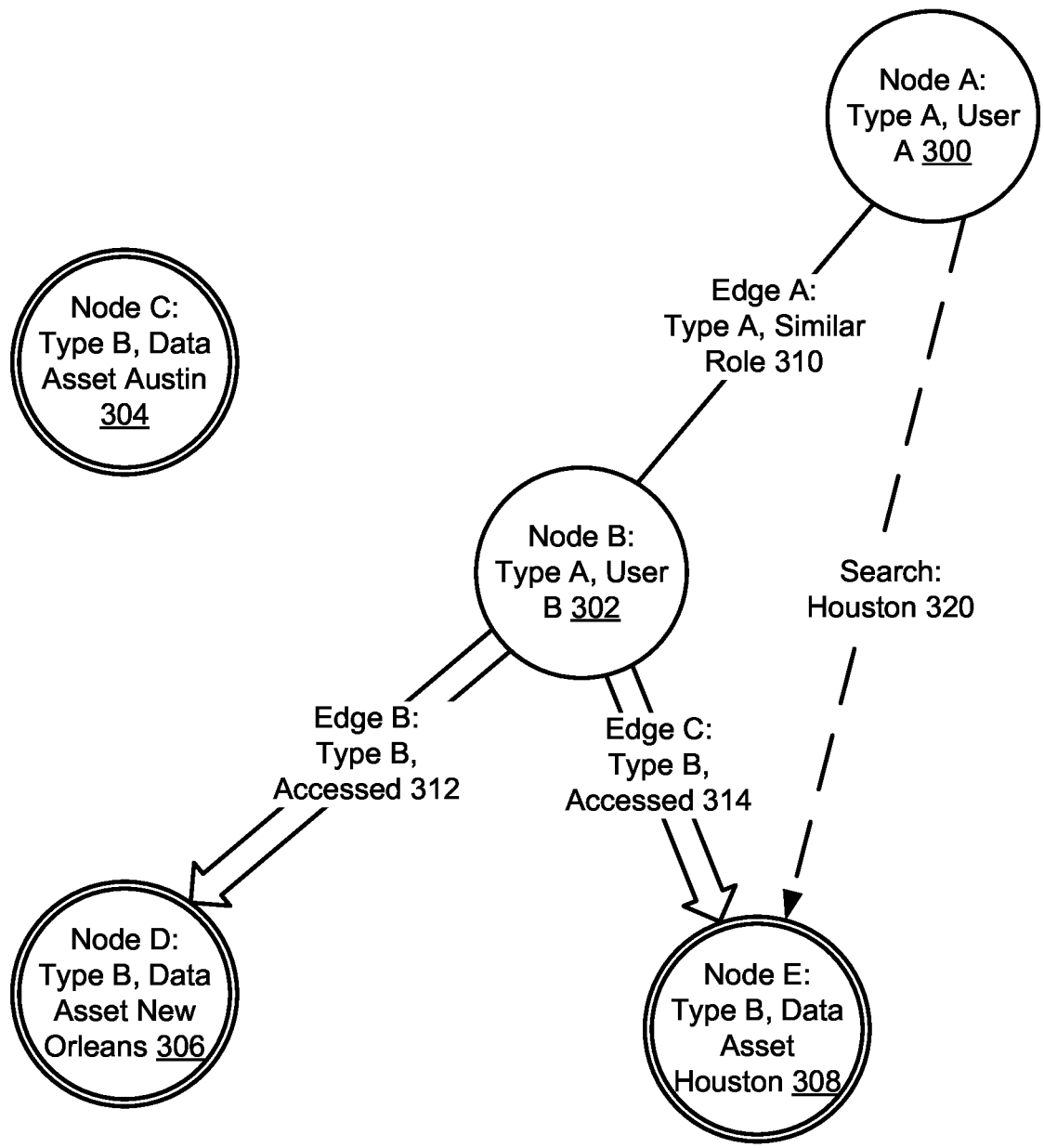
FIG. 3 shows a diagram of a visualization of a graph database in accordance with one or more embodiments of the invention.

For additional details regarding graph databases, refer to FIG. 3. For additional details regarding the information handling system (110), refer to FIG. 2.

The deployment (130) may provide any number and type of computer implemented services. When providing the computer implemented services, information that may be relevant to a user (e.g., usable to complete a task assigned to a user) may be stored as part of a data asset (e.g., 136) of the deployment. The data assets (136) may be implemented using any number and types of data structures (e.g., database, list, linked list, etc.). The data assets (136) may store any type and quantity of information and may be stored in persistent and/or transitory storage.

To manage the data assets, the deployment (130) may maintain data catalogs (138) for the data assets. The data catalogs (138) may include information regarding the data assets, use of the data assets, and/or users of the data assets, as noted above. The data catalogs (138) may be implemented using any number and types of data structures (e.g., database, list, linked list, etc.).

For example, the data catalogs may include logs of user interactions with the data assets (e.g., listings of accessed portions of the data assets), information regarding health of the entities hosting the data assets, information regarding errors encountered with respect to the data assets, various types of access metadata, such as a timestamp of each access, hypertext transfer protocol actions, internet protocol addresses of devices accessing the data assets, usernames of users that accessed the data assets, information regarding whether attempted accesses of the data assets were successful, etc. The data catalogs (138) may include additional, different, and/or less information without departing from embodiments of the invention. The data catalogs (138) may be stored in persistent and/or transitory storage.

The data assets (136) and/or data catalogs (138) may be stored in any number of information handling systems (e.g., 134, 140). The information handling systems may provide all, or a portion, of the functionality of the deployment (130).

Each of the information handling systems may host any number (e.g., none, one, two, etc.) of the data assets (136) and data catalogs (138). An information handling system may only host data catalogs or data assets without departing from the invention.

The information handling systems (e.g., 134, 140) may be geographically dispersed, by managed by different administrators, may perform different functions, and may be large in number. Consequently, it may be very challenging for a user to know the various types of data assets that may be present on these systems. Further, data assets hosted by these information handling systems may be instantiated and/or removed at any point in time further complicating the type and quantity of data assets that may be available (or made to be made available) to a user at any point in time.

The system of FIG. 1 may include any number of clients (100), information handling systems (e.g., 110) that provide search results to the clients (100), and deployments (e.g., 130). Any of the components of FIG. 1 may be operably connected to any other component and/or other components not illustrated in FIG. 1 via one or more networks (e.g., 120). The networks (e.g., 120) may be implemented using any combination of wired and/or wireless network topologies. The networks may employ any number and types of communication schemes to enable the clients (100), information handling systems (e.g., 110), and deployments (e.g., 130) to communicate with each other.

The clients (100), information handling systems (e.g., 110), and/or deployments (e.g., 130) may be implemented using computing devices. The computing devices may include, for example, a server, laptop computer, a desktop computer, a node of a distributed system, etc. (e.g., one or more being part of an information handling system). The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100), information handling systems (e.g., 110), and/or deployments (e.g., 130) described in this application and/or all, or a portion, of the methods illustrated in FIGS. 4-6. The clients (100), information handling systems (e.g., 110), and/or deployments (e.g., 130) may be implemented using other types of computing devices without departing from the invention. For additional details regarding computing devices, refer to FIG. 8. For additional details regarding the information handling system (110), refer to FIG. 2.

While the system of FIG. 1 has been illustrated and described as including a limited number of specific components, a system in accordance with embodiments of the invention may include additional, fewer, and/or different components without departing from the invention.

Turning to FIG. 2, FIG. 2 shows a diagram of an information handling system (110) in accordance with one or more embodiments of the invention. As discussed above, the information handling system (110) may provide search functionality.

To provide search functionality, the information handling system (110) may include a request manager (200) and storage (210). Each of these components is discussed below.

The request manager (200) may provide search request management services. The search request management services may be used to provide search results in response to search requests. The search request management services may include (i) obtaining a search request for a search term (e.g., one or more keywords and/or other information defining the search such as operators for the search terms), (ii)

obtaining a search result using a graph database stored in a graph database repository (212), and (iii) providing the search result to a requesting entity to respond to the search request.

To obtain the search result using the graph database, the request manager (200) may initiate graph traversal (e.g., traversing through nodes of the graph database based on edges in the graph database) to identify the search result (e.g., included in a node of the graph database). The graph traversal may start at a node associated with a user, progress to a second node associated with a second user, and terminate in one or more nodes associated with data assets of one or more deployments. Identifiers of the data assets included in the one or more terminal nodes may be used as the search results.

The request manager (200) may also provide graph database maintenance services. Graph database maintenance services may include (i) obtaining graph databases (e.g., by generating them or obtaining them from other entities) based on data catalogs for data assets, (ii) storing the graph databases in a graph database repository (212), and/or (iii) updating the graph databases in the graph database repository (212) to reflect the current state of data catalogs. For example, over time the information included in the data catalogs may change. Consequently, the request manager (200) may update the graph databases associated with the data catalogs as the data catalogs are modified (e.g., after the data catalogs are changed).

When doing so, the request manager (200) may store any quantity and type of information from data catalogs in a data catalog repository (214). The request manager (200) may use the aforementioned information to update the graph databases. For example, the request manager (200) may receive notifications of changes to the data catalogs (or via other mechanisms such as change-subscription systems) and may store the changes in the data catalog repository (214) (e.g., until the graph databases impacted by the changes may be updated).

Figure 4:
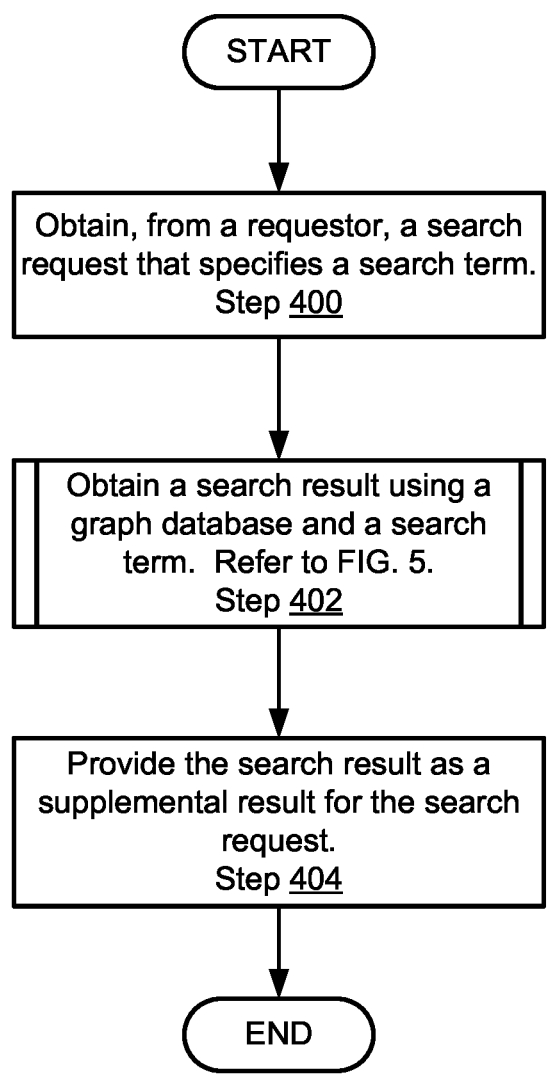
FIG. 4 shows a flowchart of a method of servicing a search request in accordance with one or more embodiments of the invention.
Figure 5:
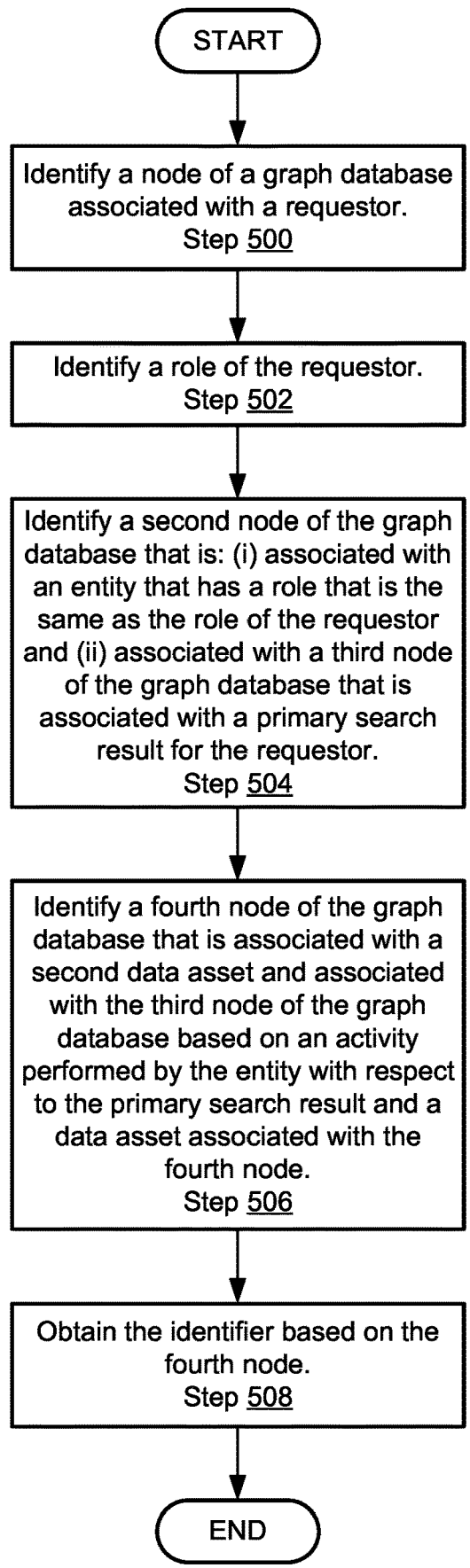
FIG. 5 shows a flowchart of a method of traversing a graph database in accordance with one or more embodiments of the invention.
Figure 6:
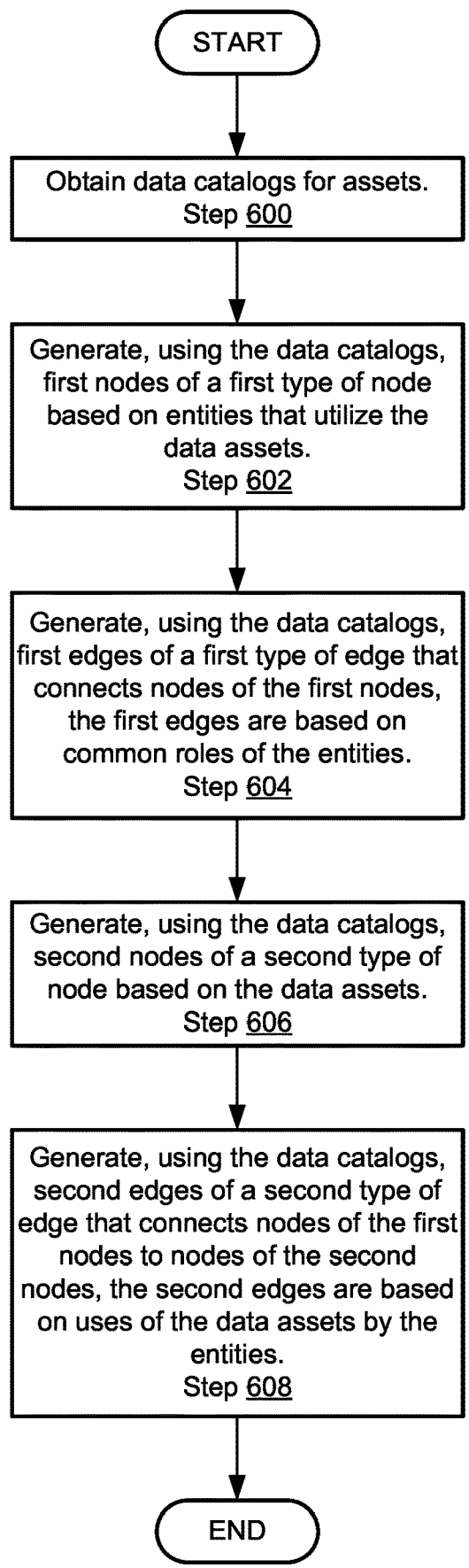
FIG. 6 shows a flowchart of a method of obtaining a graph database in accordance with one or more embodiments of the invention.

When providing its functionality, the request manager (200) may perform all, or a portion, of the methods illustrated in FIGS. 4-6.

In one or more embodiments of the invention, the request manager (200) is implemented using a hardware device including circuitry. The hardware device may be, for example, a digital signal processor, a field programmable gate array, or an application specific integrated circuit. The circuitry may be adapted to cause the hardware device to perform the functionality of the request manager (200). The request manager (200) may be implemented using other types of hardware devices without departing from the invention.

In one or more embodiments of the invention, the request manager (200) is implemented using a processor adapted to execute computing code stored on a persistent storage that when executed by the processor performs the functionality of the request manager (200). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (210) is implemented using physical devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (210) may include a memory device (e.g., a dual in line memory device) in which data is stored and from which copies of previously stored data are provided. In another example, storage (210) may include a persistent storage device (e.g., a solid-state disk drive) in which data is stored and from which copies of previously stored data is provided. In a still further example, storage (210) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (210) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (210) may store data structures including, for example, a graph database repository (212) and a data catalog repository (214). Each of these data structures is discussed below.

The graph database repository (212) may be implemented using one or more data structures that includes information utilized by the request manager (200). For example, the request manager (200) may store graph databases in the graph database repository (212). The graph database repository (212) may include any number and type of graph database. The graph database repository (212) may also include metadata regarding the graph databases such as, for example, when the graph databases were created or updated, information regarding which users and/or data assets are included in the respective graph databases, etc.

The graph database repository (212) may be maintained by, for example, the request manager (200). For example, the request manager (200) may add, remove, and/or modify information included in the graph database repository (212).

The data structures of the graph database repository (212) may be implemented using, for example, lists, tables, unstructured data, databases, etc. While illustrated in FIG. 2 as being stored locally, the graph database repository (212) may be stored remotely and may be distributed across any number of devices without departing from the invention. For additional details regarding graph databases, refer to FIG. 3.

The data catalog repository (214) may be implemented using one or more data structures that includes information usable to maintain (e.g., generate, update, validate, test, etc.) graph databases stored in the graph database repository (212). For example, the data catalog repository (214) may include data obtained from and/or derived from data catalogs.

The data catalog repository (214) may be maintained by, for example, the request manager (200). For example, the request manager (200) may add, remove, and/or modify information included in the data catalog repository (214). Such information may be obtained from any source including, for example, the data catalogs.

The data structures of the data catalog repository (214) may be implemented using, for example, lists, tables, unstructured data, databases, etc. While illustrated in FIG. 2 as being stored locally, the data catalog repository (214) may be stored remotely and may be distributed across any number of devices without departing from the invention.

While the storage (210) has been illustrated and described as including a limited number and type of data, a storage in accordance with embodiments of the invention may store additional, less, and/or different data without departing from the invention.

While the information handling system (110) has been illustrated and described as including a limited number of specific components, an information handling system in accordance with embodiments of the invention may include additional, fewer, and/or different components without departing from the invention.

As discussed above, the information handling system may utilize a graph database to provide search results. Turning to FIG. 3, FIG. 3 shows a diagram of an example graph database in accordance with one or more embodiments of the invention. In FIG. 3, data elements of the graph database are shown graphically. However, the graph database may be implemented as a data structure that include information reflecting the graphical elements shown in FIG. 3.

The example graph database may include nodes (e.g., 300, 302, 304, 306, 308) and edges (310, 312, 314). While the example graph database shown in FIG. 3 includes a specific number of nodes and edges, a graph database in accordance with embodiments of the invention may include any number of nodes and edges.

The nodes of the graph database may include at least two types of nodes (but may include additional types of nodes). Each node of each type may be based on a similar type of information.

A first type of node (illustrated as circles with single outline layer) may be based on users that may utilize data assets. In FIG. 3, nodes A and B (300, 302, respectively) are of the first type of node. For example, node A (300) is based on user A and node B (302) is based on user B).

A second type of node (illustrated as circles with double outline layer) may be based on the data assets. In FIG. 3, nodes C, D, and E (304, 306, and 308 respectively) are of the second type of node. For example, node C (304) is based on data asset Austin (e.g., a database named Austin or otherwise associated with that term by a data catalog), node D (306) is based on data asset New Orleans, and node E (308) is based on data asset Houston.

The nodes of the graph database may be connected to one another by edges. The edges may limit graph traversal in the context of a graph database. An edge may be based on a relationship between at least two nodes.

For nodes based on users, the relationships between the users may be used to assign edges. For example, consider a scenario where two users have a same role. In such a scenario an edge between the users may be added to a graph database that specifies this relationship. In FIG. 3, edge A (310) illustrates such a relationship.

The edges of the graph database may include at least two types of edges (but may include additional types of edges. Each edge of each type may be based on similar relationships.

A first type of edge (illustrated as solid lines between nodes without any arrow ends) may be based on the roles of users. In FIG. 3, edge A (310) is of the first type of edge. For example, edge A (310) is based on user A and user B both having the same role (e.g., job title, task being performed, etc.).

A second type of edge (illustrated as oversized arrows) may be based on the accesses of data assets by users. In FIG. 3, edges B and C (312, 314, respectively) are of the second type of edge. For example, edge B (312) is based on user B having accessed (e.g., read) the data asset New Orleans and edge C (314) is based on user C having accessed (e.g., read) the data asset Houston.

The nodes and edges of the example graph database may be information collected from any number of sources including, for example, data catalogs, identity stores, organization resources, permissions stores, etc.

The aforementioned arrangement of nodes and edges, derived from these data sources, enable efficient graph traversal to obtain search results. For example, consider a scenario where a search (320) by user A for Houston is obtained. When the search request is obtained, the graph database may be first searched for any nodes associated with user A and Houston. In this example, node A (300) and Node E (308) are identified.

After these nodes are identified, related nodes are then identified based on the edges (e.g., 310, 314) linking these nodes (e.g., 300, 308) to other nodes. In this case, node B (302) is identified.

Once node B (302) is identified, other nodes (e.g., 306) may be identified based on the edges linking node B (302) to other nodes. In this case, node D (306) is identified based on edge B (312) linking it to Node B (302).

An identifier of New Orleans is then used as the search result (e.g., the supplemental search result).

Other methods of graph traversal may be used without departing from the invention. For example, the traversal may start with the node A (300) associated with user A which submitted the search request, traverse to connected nodes (e.g., node B (302) here), and continue traversing through edges to identify a subset of the nodes that are associated with data assets (e.g., nodes D and E here). The identifiers of the data assets associated with the subset of the nodes may then be provided as the search result.

In one or more embodiments of the invention, the search result may include information regarding all relevant nodes and edges identified during graph traversal. This information may be provided in a manner that enables a graphical user interface to display an image similar to that shown in FIG. 3. Consequently, users may be provided with a wealth of information regarding the relevancy of various data assets to their individual needs.

A graph database may be stored using any type of data structure without departing from the invention. For example, the graph database may be stored as a database having elements representing each of the nodes and edges of the graph database. The nodes and edges may be linked to one another in a manner that enables efficient traversal of the nodes of the graph database.

For example, a node may be defined using a pseudo definition as:

Example node A
(
Type=Example Type
User=Example User
Edge A=Example edge type A to Example node B based on example common characteristic
Edge B=Example edge type B to Example node C based on accessing of Example Data Asset associated with Example node C
. . .
)

The data elements of the graph database may be specified via other methods without departing from the invention.

As discussed above, the system of FIG. 1 may provide search services to clients. FIGS. 4-6 illustrate methods that may be performed by components of the system of FIG. 1 to provide search services.

FIG. 4 shows a flowchart of a method in accordance with one or more embodiments of the invention. The method depicted in FIG. 4 may be performed to service a search request in accordance with one or more embodiments of the invention. The method shown in FIG. 4 may be performed by, for example, an information handling system (e.g., 110, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a search request that specifies a search term is obtained. The search request may be associated with a requestor (e.g., an identity of an entity such as a client that is requesting a search result). The search term may include, for example, one or more keywords, information regarding how the keywords are to be used for search purposes (e.g., Boolean operators), etc.

In one or more embodiments of the invention, the search request is obtained from a message from a client or another entity. The search request may be a data structure included in the message. The search request may be obtained via other communication modalities without departing from the invention.

In step 402, a search result is obtained using a graph database and the search term.

In one or more embodiments of the invention, the search result is obtained by (i) using the search term as a key to identify one or more nodes, (ii) traversing nodes of the graph database based on edges interconnecting nodes of the graph database to identify a subset of the nodes of the database that are both connected to the identified one or more nodes by the edges and associated with data assets, and (iii) obtaining the search result based on the nodes and/or edges identified in (i) and (ii).

In one or more embodiments of the invention, the search result is a list of identifiers of data assets associated with the nodes identified in (ii), above. In one or more embodiments of the invention, the search result is a data structure that includes information usable to generate graphical representation of a subset of the graph database identified in (i) and/or (ii), above. For example, the data structure may include listings of nodes, users/data assets associated with the nodes, edges, and relationships specified by the edges.

In one or more embodiments of the invention, the search result is obtained via the method illustrated in FIG. 5. The search result may be obtained via other methods without departing from the invention.

In step 404, the search result is provided as a supplemental search result for the search request.

In one or more embodiments of the invention, the search result is provided by sending a copy of the search result to the requestor as part of a message. For example, the search result may be a data structure transmitted as part of the message. The search result may be provided to the requestor via other methods (e.g., publish-subscribe or other communication modalities) without departing from the invention.

In one or more embodiments of the invention, the search result is provided as a supplemental search result by providing metadata along with the search result that indicates the relevancy of the search result with respect to the search request. For example, the metadata may indicate that the search result was obtained via a search using a graph database as opposed to keyword searching. Consequently, when received by the requestor, the requestor may be able to utilize the search results for its purposes based on the relevancy of the search result with respect to, for example, other search results such as search results obtained via keyword searching for the search term.

For example, consider a scenario where a user of a client issues a search request. The client may send copies of the search request to multiple search service providers including an information handling system able to provide supplemental search results. The client may then receive search results from multiple sources. The metadata provided along with the search result may enable the client and user thereof to understand the relevancy of the search result in the context of the multiple search results. Similarly, the client may effectively display and differentiate different search results for the user.

The method may end following step 404.

Using the method illustrated in FIG. 4, a broader array of search results may be provided to users thereby better enabling them to identify sources of relevant data in a distributed system.

As discussed above with respect to step 402, a graph database may be traversed to identify search results. FIG. 5 shows a flowchart of a method in accordance with one or more embodiments of the invention. The method depicted in FIG. 5 may be performed to identify search results by traversing a graph database in accordance with one or more embodiments of the invention. The method shown in FIG. 5 may be performed by, for example, an information handling system (e.g., 110, FIG. 1). Other components of the system in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a node of a graph database associated with a requestor is identified. The node may be identified by comparing an identity of the requestor to identities associated with the nodes of the graph database. The identified node may be associated with one or more other nodes that are associated with other identities (e.g., of various users that may utilize data assets).

In step 502, a role of the requestor is identified. The role of the requestor may be identified using information included in the graph database (e.g., specified by an edge that is based on the requestor's role and connected to the node associated with the requestor). For example, with respect to FIG. 3, the node may be node A (300) and edge A (310) may be utilized to identify a role of the requestor.

In step 504, a second node of the graph database is identified. The second node may be associated with an entity that has a role that is the same as the role of the requestor. The second node may also be associated with a primary search result of the requestor.

For example, the second node may be associated with a user that accessed a data asset associated with the third node. The second node may be associated with the third node by an edge that specifies a relationship between the user and the data asset (e.g., the access of the data source by the user).

With respect to FIG. 3, for example, the second node may be node B (302) and the third node may be node E (308). As seen in FIG. 3, node E (308) is associated with a data asset that may be the primary search result obtained by keyword searching (rather than performing graph database traversal to identify a supplementary search result).

In step 506, a fourth node of the graph database is identified that is associated with a second data asset and associated with the third node of the graph database based on activity performed by the entity with respect to the primary search result and a data asset associated with the fourth node.

In one or more embodiments of the invention, the fourth node is identified by, starting from the third node, traversing to all nodes directly connected to the third node that are associated with data assets and eliminating any traversed nodes that are associated with the primary search result.

For example, with respect to FIG. 3, node B (302) may be the third node and nodes D (306) and node E (308) may be both traversed to directly from the third node and are both associated with data assets (rather than users such as node B and node A). Of nodes D and E (306, 308), node E is eliminated because it is associated with the primary search result leaving node D.

In step 508, the identifier is obtained based on the fourth node. In other words, the identifier of the data asset associated with the fourth node may be used as the identifier used as the supplementary search result.

The method may end following step 508.

By using the method illustrated in FIG. 5, additional relevant search results may be identified that would otherwise not be found using other search methods such as, for example, keyword searching.

As discussed with respect to FIGS. 4 and 5, graph databases may be used to identify supplementary search results. Prior to performance of the methods illustrated in FIGS. 4 and 5, a graph database may be obtained.

FIG. 6 shows a flowchart of a method in accordance with one or more embodiments of the invention. The method depicted in FIG. 6 may be performed to obtain a graph database in accordance with one or more embodiments of the invention. The method shown in FIG. 6 may be performed by, for example, an information handling system (e.g., 110, FIG. 1). Other components of the system in FIG. 1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, data catalogs for assets are obtained. Other data sources may also be obtained such as, for example, identity repositories, credential repositories, personnel information repositories, etc.

In one or more embodiments of the invention, the data catalogs for the assets are obtained by receiving copies, or portions thereof, from other entities (e.g., deployments) via messages, remote access, or other access methods. Over time, as the data catalogs change, copies of the modifications to the data catalogs may be similarly obtained.

In step 602, first nodes of a first type of node are generated using the data catalogs based on entities that utilize the data assets.

In one or more embodiments of the invention, the first nodes are obtained by enumerating the entities that utilize the data assets (based on information included in the data catalogs) and instantiating a node in a graph database for each of the enumerated entities. The nodes may be instantiated by adding information or modifying existing information in the graph database to indicate that nodes for the enumerated entities are part of the graph database. Any number of first nodes may be generated.

The first nodes may be generated based on information included in the data catalogs. For example, the data catalogs may specify each access of the data assets and the entity that performed each access.

In step 604, first edges of a first type of edge are generated using the data catalogs. The first edges may connect nodes of the first nodes and are based on common roles of the entities associated with the first nodes.

In one or more embodiments of the invention, the first edges are generated by adding information or modifying existing information in the graph database to indicate that various nodes are associated with each other by virtue of the associated nodes being associated with entities having the same role. Any number of first edges may be generated that each connect any number of nodes.

The first edges may be based on information obtained from other sources in step 600. For example, identity information (e.g., a listing of various identities, the roles of the person specified by the identities, etc.) for the various entities included in a repository may be used to identify common roles between the entities.

In step 606, second nodes of a second type of node are generated using the data catalogs. The second nodes may be based on the data assets.

In one or more embodiments of the invention, the second nodes are generated by enumerating the data assets (based on information included in the data catalogs) and instantiating a node in the graph database for each of the enumerated data assets. The nodes may be instantiated by adding information or modifying existing information in the graph database to indicate that nodes for the enumerated data assets are part of the graph database. Any number of second nodes may be generated.

The second nodes may be generated based on information included in the data catalogs. For example, the data catalogs may specify each access of the data assets and the entity that performed each access.

In step 608, second edges of a second type of edge that connects nodes of the first nodes to nodes of the second nodes are generated using the data catalogs. The second edges may be based on uses of the data assets by the entities.

In one or more embodiments of the invention, the second edges are generated by adding information or modifying existing information in the graph database to indicate that various nodes of the first nodes are associated with various nodes of the second nodes by virtue of the use of the data assets associated with the second nodes being accessed by entities associated with the first nodes. The second edges may be generated by enumerating the entities that have accessed each respective data asset. Any number of second edges may be generated that connect any number of the first nodes to the second nodes.

The method may end following step 608.

Using the method illustrated in FIG. 6, a graph database may be instantiated that includes information usable for a user to identify relevant data assets to which the user may have or may obtain access.

Using the methods illustrated in FIGS. 4-6, organizations may better enable their users to utilize various disparate data assets maintained by their organization as well as drive better alignment between various users of an organization.

For example, consider a scenario in which users within an organization with similar interests (e.g., perform similar tasks using similar data assets) are spread across the organization. In such a scenario, the users may not regularly communicate with each other or be aware of each other. However, using a graph database, these users can be connected to each other by analyzing their similar data access patterns using the graph database. The commonalities in access patterns can be used to provide recommendations based on users with similar characteristics (e.g., roles) which can help guide users to the information they are looking for to complete their tasks.

In another example, consider a scenario in which an organization desires to ascertain anomalous uses of its data assets (which may indicate, for example, a poorly trained user, nefarious action by a user, etc.). By analyzing the access patterns included in the graph database, access patterns by users that fall outside of the norm of typical users may be easily identified. Similarly, credential levels of users may be used to flag attempts to access restricted information stored in the organization's data assets.

A graph database in accordance with embodiments of the invention may be used for other uses than those described above without departing from the invention.

To further clarify embodiments of the invention, a non-limiting example is provided in FIGS. 7.1-7.4. These figures illustrate diagrams of the operation of a data analysis system that may hosted by a client or information handling system illustrated in FIG. 1.

Example

Consider a scenario in an insurance company employs three data analysts Tom, Erin, and Sara. Tom works out of the insurance company's New York office while Erin and Sara work out of the company's offices in New Orleans. For the southern region, the insurance company aggregates information usable to set insurance rates in three different data sets which are associated with Austin, Houston, and New Orleans. Tom regularly utilizes the New Orleans data asset as part of his work, Erin uses the New Orleans and Austin data assets, and Sara regularly utilize the New Orleans and Houston data assets.

To make the data included in these data sets more visible within the company, the insurance company has setup a search system similar to that described with respect to FIGS. 1-6 of this application. To do so, the request manager (not shown) sets up a graph database based on the data catalogs associated with the company's data assets. FIGS. 7.1-7.4 show diagrams of a portion of the graph database, setup by the request manager, that is relevant for search purposes with respect to Tom.

Turning to FIG. 7.1, to setup the graph database, the request manager initially enumerates the users that utilize the company's data assets using the data catalogs. In this example, the enumeration includes Tom, Erin, and Sara. Based on this enumeration, the request manager instantiates nodes A-C (700, 702, 704) which are associated with Tom, Erin, and Sara, respectively.

After instantiating the nodes, the request manager next looks for common roles between Tom, Erin, and Sara. These common roles may be identified, for example, using other data sources such as human resources data, credentials, identification repositories, etc. In this case, all three have the same role. Based on these commonalities, turning to FIG. 7.2, the request manager instantiates edges A and B (720, 722) between Nodes A and B and nodes A and C, respectively.

Once edges A and B are instantiated, the request manager enumerates the data assets included in the data catalogs. In this case, each of the data assets are utilized by at least one of the users so data assets Austin, New Orleans, and Houston are enumerated. Turning to FIG. 7.3, nodes C, D, and E (706, 708, and 710) are instantiated based on these respective data assets.

To complete the graph database, the request manager next identifies all uses of the data assets by the users included in the data catalogs. Turning to FIG. 7.4, based on the identified uses of the data assets, the request manager instantiates edges C, D, E, F, and G (730, 732, 734, 736, 738) to reflect the uses of these data assets by Erin, Tom, and Sara.

Recently, Tom has been tasked with developing new insurance rates for customers located in Alabama. By virtue of his experience, Tom is aware of the New Orleans data asset but is unaware that data assets Austin and Houston are available. Consequently, when Tom initially begins his search for data that may be used to assist him in his project, he beings with a search for New Orleans.

Based on keyword searching, the New Orleans data asset is likely to be identified and presented to Tom for his review. However, keyword searching of New Orleans is unlikely to identify Austin or Houston as being relevant.

Because the insurance company has implemented a system similar to that described with respect to FIGS. 1-6, Tom's keyword of New Orleans is also provided to the request manager for searching.

Using the graph database, the request manager identifies that Nodes B and C are related to Node A associated with Tom. The request manager also identifies that nodes B and C are also associated with nodes C, D, and E. Because Node D is associated with Tom's keyword search, the request manager determines that the data assets associated with Nodes C and E are also likely to be relevant to Tom's search. Consequently, the request manager provides the identifiers of the Austin and Houston data assets as supplemental search results.

Accordingly, when Tom receives the search results, all three data assets Austin, New Orleans, and Houston are presented to Tom as being relevant to his search. Consequently, Tom is provided with a broader array of information (e.g., the Austin and Houston data assets) which may help him in carrying out his assigned task.

End of Example

Thus, as illustrated in FIGS. 7.1-7.4, embodiments of the invention may provide a method of searching that may increase the quantity of relevant search results to users.

Figure 8:
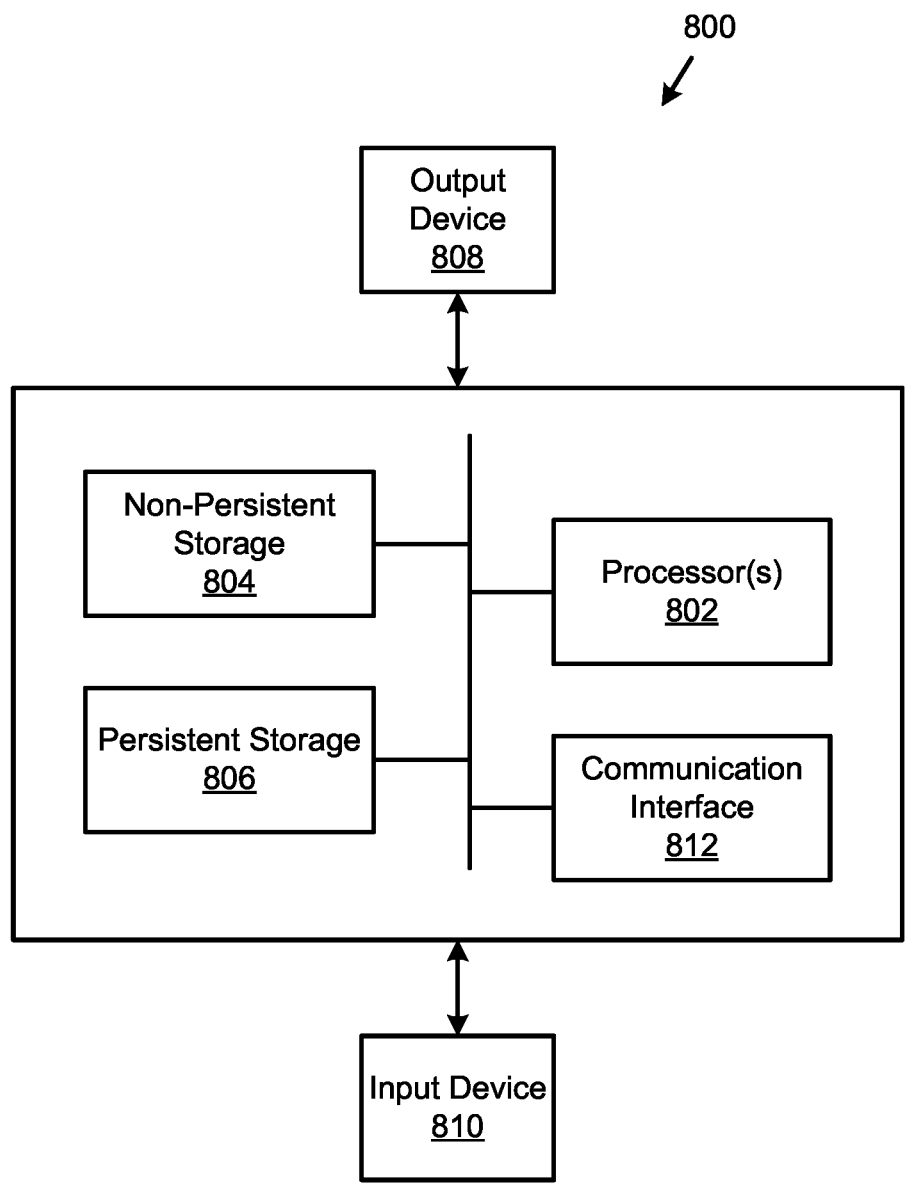
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for identifying relevant information. Specifically, embodiments of the invention may methods for identifying sources of relevant information within an organization. The methods may utilize data catalogs that reflect uses of information sources and information regarding users to obtain a graph database usable for search purposes. By utilizing a graph database populated using these sources of information, relevant information that would otherwise not be identified by performing keyword or other types of searching may be identified.

Thus, embodiments of the invention may address the problem of information identification within a system. For example, the relevance of information may be identified using information unrelated to the searched for information. Rather, relationships between users may be used as a basis for identifying relevant information.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for servicing search requests for information stored in data assets, comprising:
   storage for storing a graph database based on at least one data catalog for the data assets; and
   a processor programmed to:
      obtain, from a requestor, a search request of the search requests, wherein the search request specifies a keyword search term;
      obtain a first identifier of a data asset of the data assets using the graph database and the keyword search term; and
      provide the first identifier as a supplemental result for the search request,
   wherein obtaining the first identifier of the data asset of the data assets using the graph database and the keyword search term comprises:
      identifying a node of the graph database associated with the requestor;
      identifying a first role of the requestor;
      identifying a second node of the graph database that is:
         associated with an entity that has a second role that is the same as the first role, and
         associated with a third node of the graph database that is:
            associated with the data asset of the data assets, and
            associated with a primary search result used to satisfy the search request;
      identifying a fourth node of the graph database associated with a second data asset of the data assets, wherein the fourth node of the graph database is identified based on an activity performed by the entity with respect to both the data asset and the second data asset; and
      obtaining the first identifier based on the fourth node.

2. The information handling system of claim 1, wherein the activity is reading a portion of data from the data asset.

3. The information handling system of claim 1, wherein the processor is further programmed to:
   prior to obtaining the search request:
      obtain a plurality of data catalogs for the data assets;
      generate, using the plurality of data catalogs, a first plurality of nodes of a first type of node based on entities that utilize the data assets;
      generate, using the plurality of data catalogs, a first plurality of edges of a first type of edge that connects nodes of the first plurality of nodes, wherein the first plurality of edges is based on common roles of the entities;
      generate, using the plurality of data catalogs, a second plurality of nodes of a second type of node based on the data assets; and
      generate, using the plurality of data catalogs, a second plurality of edges of a second type of edge that connects nodes of the first plurality of nodes to nodes of the second plurality of nodes, wherein the second plurality of edges is based on uses of the data assets by the entities.

4. The information handling system of claim 1, wherein the supplemental result is provided along with a primary result obtained by keyword searching at least a portion of the data assets for the keyword search term.

5. The information handling system of claim 4, wherein the primary result comprises a second identifier of a second data asset of the data assets.

6. The information handling system of claim 5, wherein the second data asset is not identifiable by keyword searching for the keyword search term.

7. The information handling system of claim 1, wherein the graph database comprises a plurality of nodes keyed to entities that utilize the data assets and the data assets.

8. The information handling system of claim 7, wherein the plurality of nodes is interconnected by edges based on activities of the entities performed with respect to the data assets and commonalities in roles of the entities.

9. The information handling system of claim 8, wherein the edges enable the plurality of nodes to be traversed to identify the supplemental result.

10. A method for servicing search requests for information stored in data assets, comprising:
   obtaining, from a requestor, a search request of the search requests, wherein the search request specifies a keyword search term;
   obtaining a first identifier of a data asset of the data assets using a graph database and the keyword search term, wherein the graph database is based on based on at least one data catalog for the data assets; and
   providing the first identifier as a supplemental result for the search request,
   wherein obtaining the first identifier of the data asset of the data assets using the graph database and the keyword search term comprises:
      identifying a node of the graph database associated with the requestor;
      identifying a first role of the requestor;
      identifying a second node of the graph database that is:
         associated with an entity that has a second role that is the same as the first role, and
         associated with a third node of the graph database that is:
            associated with the data asset of the data assets, and
            associated with a primary search result used to satisfy the search request;
      identifying a fourth node of the graph database associated with a second data asset of the data assets, wherein the fourth node of the graph database is identified based on an activity performed by the entity with respect to both the data asset and the second data asset; and
      obtaining the first identifier based on the fourth node.

11. The method of claim 10, wherein the activity is reading a portion of data from the data asset.

12. The method of claim 10, further comprising:
   prior to obtaining the search request:
      obtaining a plurality of data catalogs for the data assets;
      generating, using the plurality of data catalogs, a first plurality of nodes of a first type of node based on entities that utilize the data assets;
      generating, using the plurality of data catalogs, a first plurality of edges of a first type of edge that connects nodes of the first plurality of nodes, wherein the first plurality of edges is based on common roles of the entities;
      generating, using the plurality of data catalogs, a second plurality of nodes of a second type of node based on the data assets; and
      generating, using the plurality of data catalogs, a second plurality of edges of a second type of edge that connects nodes of the first plurality of nodes to nodes of the second plurality of nodes, wherein the second plurality of edges is based on uses of the data assets by the entities.

13. The method of claim 10, wherein the supplemental result is provided along with a primary result obtained by keyword searching at least a portion of the data assets for the keyword search term.

14. A non-transitory computer readable medium comprising computer readable program code, which when executed by a computer processor enables the computer processor to perform a method to service search requests for information stored in data assets, the method comprising:
   obtaining, from a requestor, a search request of the search requests, wherein the search request specifies a keyword search term;
   obtaining a first identifier of a data asset of the data assets using a graph database and the keyword search term, wherein the graph database is based on based on at least one data catalog for the data assets; and
   providing the first identifier as a supplemental result for the search request,
   wherein obtaining the first identifier of the data asset of the data assets using the graph database and the keyword search term comprises:
      identifying a node of the graph database associated with the requestor;
      identifying a first role of the requestor;
      identifying a second node of the graph database that is:
         associated with an entity that has a second role that is the same as the first role, and
         associated with a third node of the graph database that is:
            associated with the data asset of the data assets, and
            associated with a primary search result used to satisfy the search request;
      identifying a fourth node of the graph database associated with a second data asset of the data assets, wherein the fourth node of the graph database is identified based on an activity performed by the entity with respect to both the data asset and the second data asset; and
      obtaining the first identifier based on the fourth node.

15. The non-transitory computer readable medium of claim 14, wherein the activity is reading a portion of data from the data asset.

16. The non-transitory computer readable medium of claim 14, wherein the method further comprises:
   prior to obtaining the search request:
      obtaining a plurality of data catalogs for the data assets;
      generating, using the plurality of data catalogs, a first plurality of nodes of a first type of node based on entities that utilize the data assets;
      generating, using the plurality of data catalogs, a first plurality of edges of a first type of edge that connects nodes of the first plurality of nodes, wherein the first plurality of edges is based on common roles of the entities;

generating, using the plurality of data catalogs, a second plurality of nodes of a second type of node based on the data assets; and generating, using the plurality of data catalogs, a second plurality of edges of a second type of edge that connects nodes of the first plurality of nodes to nodes of the second plurality of nodes, wherein the second plurality of edges is based on uses of the data assets by the entities.

17. The non-transitory computer readable medium of claim 14, wherein the supplemental result is provided along with a primary result obtained by keyword searching at least a portion of the data assets for the keyword search term.

\* \* \* \* \*